United States Patent [19]
Wohlert et al.

[11] 4,114,305
[45] Sep. 19, 1978

[54] ILLUMINATED FISHING LURE

[75] Inventors: Andrew M. Wohlert, St. Charles; James Haruch, Clarendon Hills, both of Ill.

[73] Assignee: Riverbank Laboratories, Inc., Geneva, Ill.

[21] Appl. No.: 740,425

[22] Filed: Nov. 10, 1976

[51] Int. Cl.² ............................................. A01K 85/00
[52] U.S. Cl. ........................................ 43/17.6; 310/15; 310/25; 315/130
[58] Field of Search ..................... 43/17.6, 17.5, 17.1; 340/10, 17; 310/15, 25, 30; 315/130

[56] References Cited
U.S. PATENT DOCUMENTS

| 2,740,946 | 4/1956 | Geneslay | 310/15 UX |
| 2,757,475 | 8/1956 | Pankove | 43/17.1 |
| 3,100,292 | 8/1963 | Warner, Jr. et al. | 340/17 |
| 3,382,598 | 5/1968 | Wilson | 340/10 X |
| 3,696,251 | 10/1972 | Last et al. | 310/15 X |
| 3,869,641 | 3/1975 | Goldberg | 315/130 X |
| 3,940,868 | 3/1976 | Northcutt | 43/17.6 |
| 4,070,784 | 1/1978 | Yokogawa et al. | 43/17.5 X |

FOREIGN PATENT DOCUMENTS

| 1,441,640 | 5/1966 | France | 43/17.6 |
| 612,106 | 10/1926 | France | 43/17.6 |

Primary Examiner—Donovan F. Duggan
Attorney, Agent, or Firm—Edmond T. Patnaude

[57] ABSTRACT

One or more LEDs are connected across an induction coil wound on a tube slidably carrying an axially polarized permanent magnet, the tube being closed at both ends so that axial reciprocation of the tube causes the magnet to move back and forth through the coil and energize the LEDs.

6 Claims, 7 Drawing Figures

ILLUMINATED FISHING LURE

The present invention relates in general to the art of generating pulses of voltage and current, and it relates more particularly to a novel method and apparatus for emitting light in response to physical movement of a body.

BACKGROUND OF THE INVENTION

It is well known that electricity is generated in an electric coil when the coil is in the presence of a changing magnetic field. Electric generators operating on this principal have been designed wherein a piston carrying one or more permanent magnets is reciprocally driven back and forth through a coil. For several reasons, however, such devices have not been used to any great extent.

There are many applications for a small size, low power electric generator which produces voltage pulses in response to physical movement. Such a generator is particularly well suited for energizing light emitting diodes since such devices operate at extremely low current levels, and would have many applications in movement detecting instruments and in accelerometers.

In another application, the generator can be attached to a limb or torso of a person or other animal so as to produce light pulses in response to body movements. A light sensitive recorder may be associated with the diode to provide a permanent record of such movements.

Another application of this invention is in a fish lure wherein one or more light emitting diodes mounted on the lure flash in response to sudden movement of the lure as the fishing line is jerked. Since such a generator has no parts requiring replacement, it can be fixedly and sealably mounted in the body of the lure.

Another use for the pulse generator and one or more associated light emitting diodes is in infants' toys. Such a generator is easily incorporated in a baby rattle where the blinking light is amusing and useful in the development of the infant. Also, such a generator can be mounted to a wheel of a push or pull toy so that the light emitting diode blinks on and off as the wheel turns.

SUMMARY OF THE INVENTION

Briefly, there is provided in accordance with one aspect of the present invention a method of generating electric pulses by reciprocating a non-magnetic tube to cause a permanent magnet slidably mounted therein to move back and forth through a coil wound on the tube. In accordance with another feature of the invention there is provided an elongated non-magnetic non-conductive tube, closed at both ends and having an axially polarized permanent magnet freely slidable therein. An induction coil is wound on the central portion of the tube and the lengths of the magnet and tube are such that the magnet can move completely through the coil in both directions. One or more light emitting diodes connected across the coil flash each time the magnet moves through the coil at at least a predetermined velocity. The faster the movement of the magnet the greater will be the voltage generated. Diodes having different forward conducting voltage levels with suitable resistors may thus be connected in parallel across the coil to provide an indication of the physical acceleration of the generator.

Several different devices utilizing the said generator are described in detail hereinafter but it will be understood that the basic method and apparatus of the invention has many other applications.

BRIEF DESCRIPTION OF THE DRAWINGS

Further objects and advantages and a better understanding of the present invention can be had by reference to the following detailed description, wherein.

DETAILED DESCRIPTION OF THE INVENTION

Figure 1:
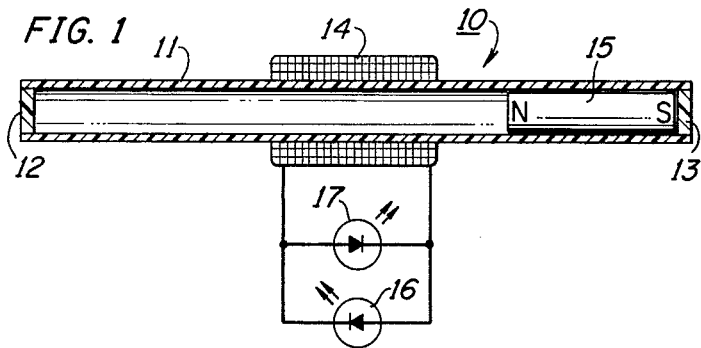
FIG. 1 is a longitudinally sectioned view of a pulsating light source embodying the present invention.

Referring to FIG. 1, a pulsating light generator 10 comprises an elongated non-magnetic tube 11 formed of a suitable non-conductive rigid material having non-magnetic end caps 12 and 13 affixed to and closing the respective ends thereof. An induction coil 14 is wound on the central portion of the tube 11 and a cylindrical permanent magnet 15 is slidably disposed in the tube 11. As indicated in the drawing, the magnet 15 is polarized in an axial direction and has a length less than the distances between the inner walls of the end caps 12 and 13 and the adjacent ends of the coil 14 whereby the magnet 15 may be positioned in the tube 11 completely out of the coil 14. An electric light source such, for example, as a pair of LEDs 16 and 17 is connected across the coil 14. The light emitting diodes 16 and 17 are connected in parallel in opposite conditions of polarity so that one LED emits light when the voltage polarity is in one direction and the other LED emits light when the voltage polarity is in the opposite direction.

The inner wall of the tube 11 is preferably smooth thereby to provide only a small physical resistance to the movement of the magnet 15 through the tube 11. The magnet 15 is preferably a solid metallic member having a sufficient mass so that when the tube 11 is physically shaken or reciprocated in an axial direction the magnet 15 moves back and forth from one end of the tube to the other thereby completely passing through the coil 14.

Figure 2:
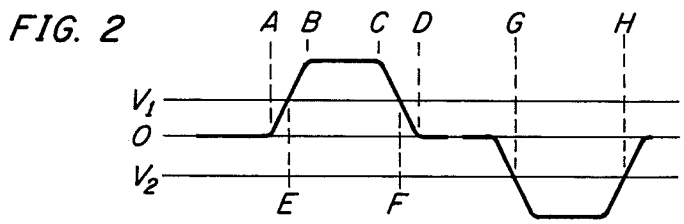
FIG. 2 is an illustration of the waveform of the voltage developed across the coil in the device of FIG. 1 as the magnet moves from one end of the device to the other.

With reference to FIG. 2, the waveform of voltage which is shown therein is theoretically generated as the magnet 15 moves from one end of the tube to the other. In actuality each of the positive and negatively going pulses more closely resemble one-half of a sinewave, but it is believed that the present invention may be more readily understood by reference to the theoretical wave forms. The point A on the wave form occurs as the leading end of the magnet moves into proximity with the coil 14. The point B occurs when the leading end of the magnet is fully within the coil 14 but the effect of the trailing end has not yet manifested itself. The point C occurs when the number of turns of the coil 14 linked by the magnetic field begins to decrease as, for example, when the leading edge begins to move out of the coil in the case of a long magnet or in the case of a short magnet as the trailing edge moves into the coil while the leading edge is still within the coil. The point D occurs when there is no change in the number of turns linked by the magnetic field. This zero output voltage condition continues until the turns begin to become unlinked. Where, for example, the effective length of the magnet 15 is equal to the length of the coil 14 the output voltage simply crosses through zero in its excursion from the positive to the negative value. The negative voltage is generated as the number of turns linked by the magnetic flux is decreasing.

Assuming that the light source 16 is an LED and has a forward conducting voltage of $V_1$, the diode 16 will be energized and emit light as the magnet 15 moves between the positions E and F as shown in FIG. 2. In like manner, the LED 17, being polarized in the opposite direction relative to the LED 16 and the coil 14, will emit light while the magnet moves between the positions G and H. Accordingly, as the magnet 15 moves from one end of the tube 11 to the other first the LED 17 and then the LED 16 blinks on and off.

The device of FIG. 1 may be used as an accelerometer by employing diodes 16 and 17 which have different forward conducting voltages so that, for example, the diode 16 will emit light in response to a predetermined acceleration while the diode 17 will not emit light unless the acceleration is greater than that which causes the diode 16 to be energized.

Figure 3:
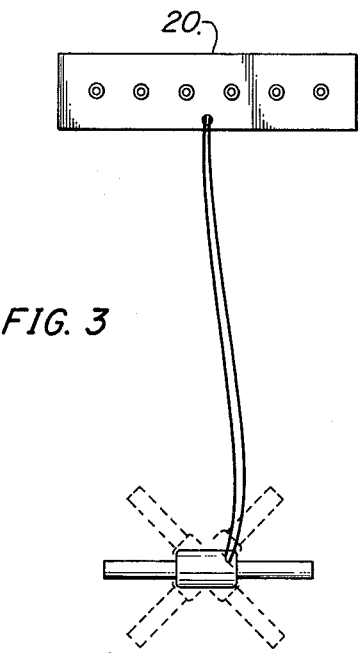
FIG. 3 is a schematic illustration of an accelerometer embodying the present invention.

In FIG. 3 there is illustrated in schematic form an accelerometer using two pairs of three light emitting diodes having different forward conducting voltage levels. Preferably, these diodes respectively emit light at different spectral positions thereby facilitating the visual recognition of the degree of acceleration of the associated generator. In this embodiment of the invention it is preferred for many applications that the electric generator portion of the device be connected to the diodes by means of a flexible electric conductor so that the read-out panel incorporating the light sources can be mounted in a physically isolated position from the generator whereby movement of the generator is not transmitted to the read-out panel. It will be apparent that a permanent recording device may be associated with the read-out panel 20 and that additional generators oriented in a plurality of different positions as shown in dotted lines may be connected in parallel with the other generators thereby to indicate an acceleration in a number of different directions.

Figure 4:
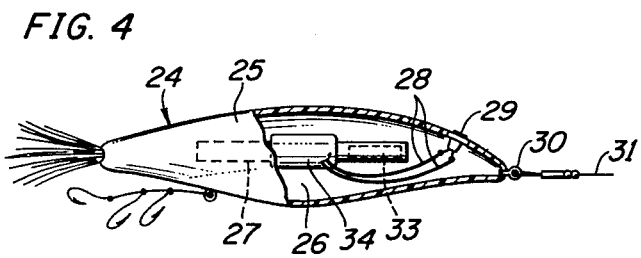
FIG. 4 is a partially sectioned side view of a fish lure embodying the invention.

Referring to FIG. 4, a fish lure 24 includes a body 25 having a cavity 26 therein hermetically sealed from the exterior of the body 25. An electric generator 27 of the type illustrated in FIG. 1 is mounted within the cavity 26 and connected by a pair of conductors 28 to one or more light emitting diodes 29 mounted to the body portion 25 on the exterior thereof. A suitable connector 30 is mounted at one end of the lure 24 for connection to a fish line 31. The connector 30 is located on the body 25 so that when a sharp tug is exerted on the line 31 the lure 24 moves more or less in a direction parallel to the longitudinal axis of the generator 27. The end caps on the tube may be formed of a resilient material to cause the magnet to bounce back and forth when the line 31 is jerked. While only one diode 29 is illustrated in FIG. 4 it will be understood that two or more such diodes may be employed and they are preferably connected in opposite directions of polarity across the coil.

Figure 5:
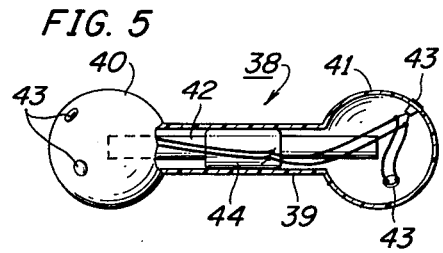
FIG. 5 is a partially sectioned side view of a baby rattle embodying the invention.

Referring now to FIG. 5, an infant's rattle 38 has a central tubular handle portion 39 and enlarged ball-like ends 40 and 41. A pulse generator 42 constructed in accordance with the illustration of FIG. 1 is mounted in the handle 39 and a plurality of LED devices 43 are connected in parallel across the coil portion of the generator 42 and mounted in visible locations on the end portions 40 and 41 of the rattle. It will be apparent that shaking of the rattle 38 in the axial direction will cause the magnet in the generator to reciprocate back and forth through the coil 44 to cause the diodes 43 to emit pulses of light.

Figure 6:
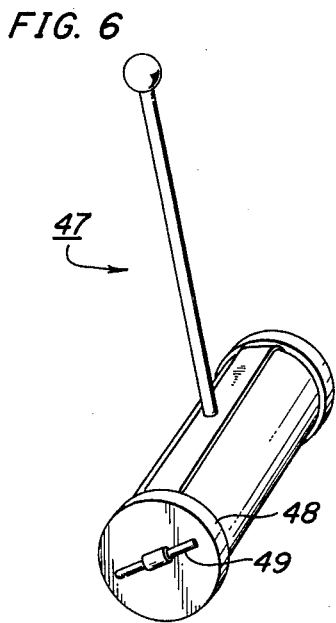
FIG. 6 is a perspective view of a wheeled vehicle embodying the invention.

Referring to FIG. 6, a toy 47 has a rotatable wheel 48 thereon. An electric pulse generator invention is mounted on the side of the wheel 48 and is illustrated by the number 49. The generator thus emits pulses of electricity as the wheel 48 is rotated at a speed such that the magnet is not held in one end of the tube by centrifugal force. Associated light emitting diodes may be mounted at any suitable location on the toy and connected through suitable slip rings to the generator 49. Also, the pulse generator may be mounted inside the drum and caused to move up and down by a suitable mechanical linkage. The invention finds similar applications on other types of toys such as those where a child strikes an anvil with a mallet thereby causing the magnet to move through the coil.

Figure 7:
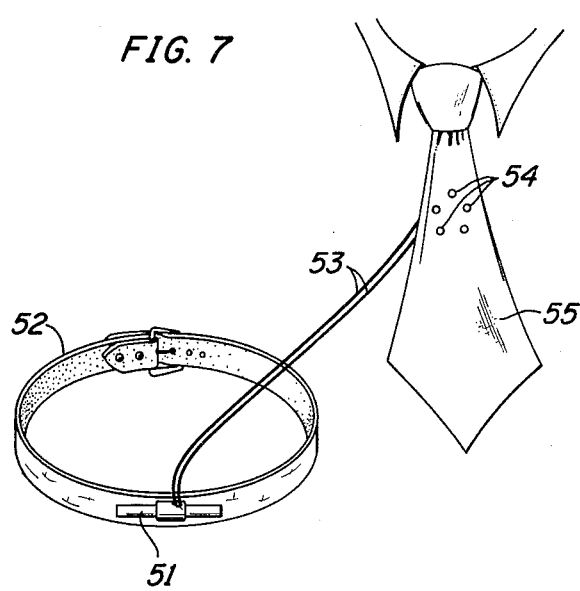
FIG. 7 illustrates the present invention as part of a motion indicator for attachment to the torso of a person or other animal.

Referring to FIG. 7 there is shown the device of the present invention as a novelty item. In that case the generator, identified at 51, includes a strap or belt 52 for attachment thereof to a limb or torso of a person. A pair of flexible connectors 53 electrically connect a plurality of light emitting diodes 54 in parallel across the coil of the generator 51. These diodes, may be mounted, for example, in earrings, on a necktie as shown or incorporated in other types of necklaces, in the hair or in any other suitable location. Preferably, although not necessarily the diodes are not mounted directly on the generator so that the portion of the body which is moving to generate the pulses of electric energy for energizing the diodes does not necessarily physically move the diodes 54.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A fish lure, comprising
 a body,
 a pulse generator hermetically sealed within said body,
 said pulse generator including a non-magnetic tube closed at both ends, a coil of insulated, conductive wire wound on an intermediate section of said tube, and an elongated, axially polarized, permanent magnet slidably disposed in said tube,
 an electric lamp mounted to said body in a position to be visible from the exterior of said body
 conductive means electrically connecting said lamp across said coil, and means for attaching a fishing line to said body so that a longitudinal jerk of said line causes said magnet to move through said coil to generate a pulse of current which causes said lamp to emit a flash of light.

2. A fish lure according to claim 1 comprising resilient means disposed at the ends of said tube for causing said magnet to bounce back and forth in said tube when said fish line is jerked.

3. A fish lure according to claim 1 wherein said electric lamp is a light emitting diode.

4. A fish lure according to claim 3 comprising another light emitting diode connected across said coil, said diodes between connected in opposite directions of polarity across said coil.

5. A fish lure according to claim 1 wherein said body is elongated, said fishing line being connected to one end of said body.

6. A fish lure according to claim 5 wherein said tube lies substantially parallel to the longitudinal axis of said body.

* * * * *